United States Patent [19]
Smith, Jr.

[11] 3,745,830
[45] July 17, 1973

[54] REMOTE SURFACE TEMPERATURE DETERMINATION
[75] Inventor: Rossman W. Smith, Jr., Pittsburgh, Pa.
[73] Assignee: Gulf Research & Development Company, Pittsburgh, Pa.
[22] Filed: July 13, 1971
[21] Appl. No.: 162,162

[52] U.S. Cl.................. 73/344, 73/355 EM, 356/43
[51] Int. Cl. .............................................. G01j 5/02
[58] Field of Search .................. 73/355 R, 355 EM, 73/344; 356/43, 210; 250/83.3 H

[56] References Cited
UNITED STATES PATENTS
3,433,052  3/1969  Maley ............................... 73/355 R
3,448,267  6/1969  Blythe ........................... 250/83.3 H
3,549,264  12/1970  Christie............................. 356/210
3,451,254  6/1969  Maley ........................... 73/355 EM OTHER PUBLICATIONS
Hausmann et al., Physics, Copyright 1935 and 1939, Page 602, FIG. 380.

Primary Examiner—Richard C. Queisser
Assistant Examiner—Denis E. Corr
Attorney—Meyer Neishloss et al.

[57] ABSTRACT

Method and apparatus for making remote surface temperature surveys of the earth, as from aircraft, wherein the emissivity error is eliminated by use of a laser which is pulsed on and off to permit determination of earth reflectivity and hence a value for its emissivity. Apparent measured temperature is then corrected to true temperature using this value of emissivity.

11 Claims, 1 Drawing Figure

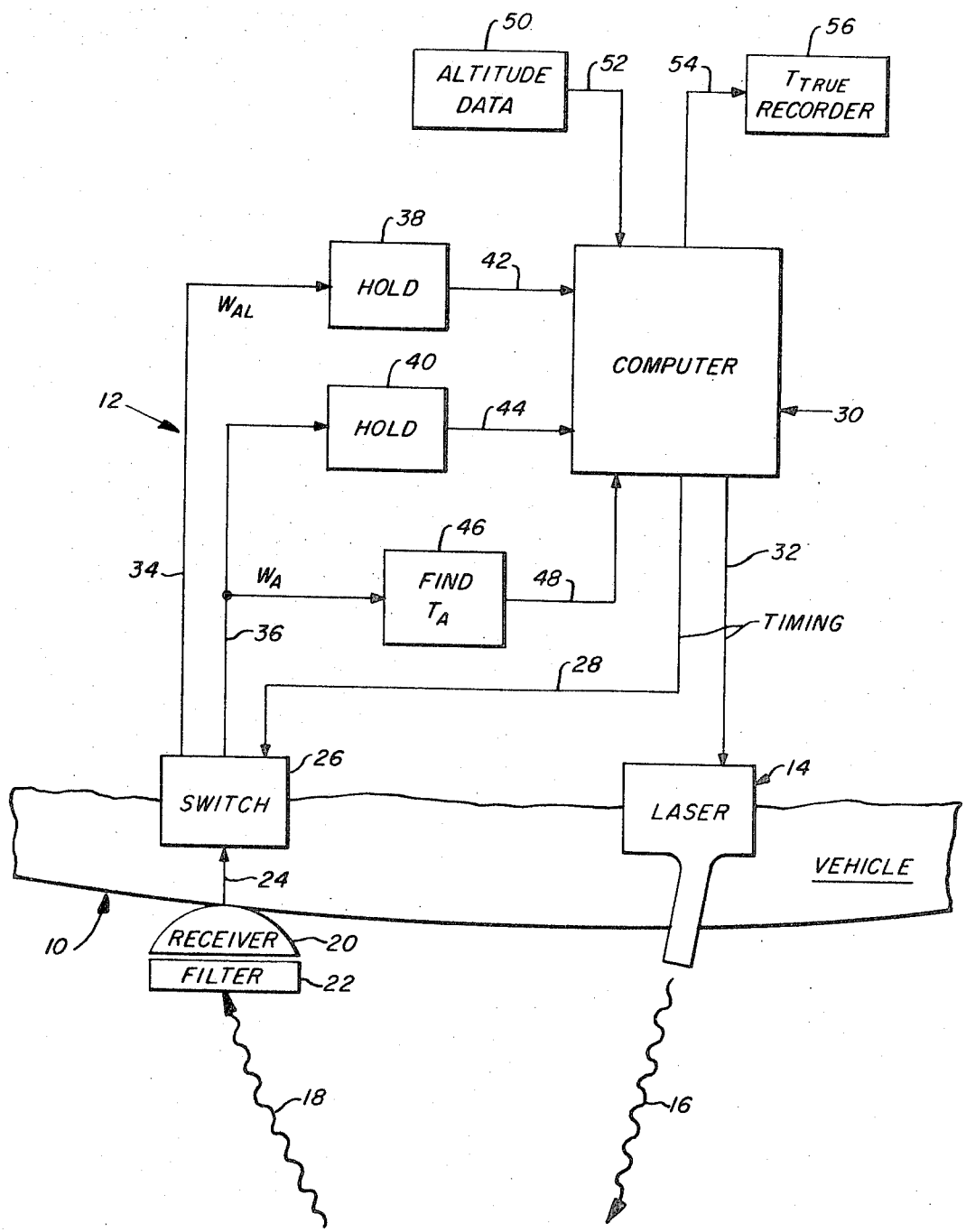

REMOTE SURFACE TEMPERATURE DETERMINATION

This invention pertains to method and apparatus for accurately and remotely determining the true surface temperature of a body. The invention has utility in the fields of meteorology and mineral exploration. In exploring for oil, one school of geophysics holds that petroliferous deposits evidence themselves at least partially as temperature anomalies at the surface overlying the deposit. Other minerals besides oil manifest themselves in this manner, specifically oxidizing suplhides, which are commonly associated with economically valuable mineral deposits. Thus, it is often desirable to make a temperature survey to find such anomalies. Further, it is desired to do so remotely, as with aircraft, so that relatively large areas can be relatively rapidly explored.

When making such temperature surveys over regions covered with water, the raw data is quite usable with very little processing. Water is a uniform conductor of heat, and the surface of the water is relatively smooth, calm weather being chosen to achieve this helpful condition, and the emissivity can be handled as a constant. However, when making a remote surface temperature survey over land, difficulties are encountered because of the non-homogeneity of the land. That is, as is generally known, two rocks which are in fact at the same temperature could be detected remotely as being at different temperatures. This error is at least substantially attributable to the difference in the heat emissivities of the two rocks, i.e., the differing ability of the two different rocks or the like to emit heat.

The present invention provides method and apparatus to make a remote surface temperature survey and to correct the data obtained for the error in the data caused by the different emissivities of the earth materials being surveyed. The invention includes the use of a specific laser which operates at a certain frequency which corresponds to the temperature range or heat range normally encountered in earth surveys. The use of this specific laser, further aided by a filter at this same frequency on the receiver, achieves the advantages of a very low absorption by the atmosphere for energy at this frequency, a close match between the frequency of maximum radiant emittance of earth materials (thermal radiators) in their natural environment, and the easy availability of instruments for both transmission and reception. A laser is used because of its advantages of non-dispersion over relatively long distances to produce a meaningful amount of reflected energy, the narrow frequency spectrum of its transmitted wave, and its specific frequency of primary mode operation, (10.6 micrometers).

The invention depends upon well established laws of nature. The method comprises using the laser to determine the reflectivity of the surface being examined, determining its emissivity from this value, and then using the value of emissivity determined to correct the raw temperature data to thereby obtain an emissivity corrected temperature, which corrected temperature very closely approximates the actual surface temperature.

The above and other advantages of the invention will be pointed out or will become evident in the following detailed description and claims, and in the accompanying drawing also forming a part of the disclosure, in which the sole figure is a schematic representation of apparatus embodying the invention.

Referring now in detail to the drawing, 10 represents a vehicle, it is anticipated that aircraft will be used most frequently, on which the apparatus 12 embodying the invention is mounted. A laser 14 directs its energy, indicated at 16, from the vehicle 10 down to the earth which is being surveyed. Reference numeral 18 indicates both the part of the energy 16 which is reflected back to the vehicle 10 when the laser is on, and the natural radiant energy from the ground being examined. As will appear in more detail below, the laser 14 is rapidly pulsed during use, and thus energy arrow 18, more accurately, represents the total energy reaching the vehicle 10 from the ground which sometimes includes some reflected energy 16, and sometimes does not, depending upon the state of laser 14 at any particular time. The laser must be a $CO_2$ laser which produces energy at substantially 10.6 micrometers. This particular frequency energy is used because it closely corresponds to the frequency of maximum radiant emittance of earth materials (thermal radiators) in their natural environment; it closely corresponds to the frequencies of minimum atmospheric attenuation of radiant energy (atmospheric window); and it is the frequency of primary-mode operation (thus maximum radiated power) of the $CO_2$ laser.

Mounted on vehicle 10 is a suitable energy receiver 20 provided with a filter 22. The filter passes energy only at 10.6 micrometers, and the receiver 20 is calibrated with a particular filter 22 of this frequency in place. Filter 22 should be a narrow bandpass filter. A 10.5 to 10.7 micrometer filter is available from Baird-Atomic Co. An important advantage of the present invention is that all components are either commercially available or very easily fabricated. The receiver 20 is preferably a remote temperature detector, and many are commercially available, such as the model IT-4B or PRT-5 Infrared Remote Thermometer made by the Barnes Engineering Company of Stamford, Connecticut, or Texas Instruments RS-310 or RS-14, or the Bendix Corporation Thermal Mapper, or the like. Suitable lasers are available from many sources. Similarly, various competing types, styles and capacities of small general purpose digital or analog computers are commercially available. The custom circuitry required is elementary to one skilled in electronics. As is well known, the apparatus 20 and 22 would be carried inside the vehicle 10, a suitable opening with a protective lens being provided for energy passage, and the drawing is schematic in this regard.

Line 24 represents means to transmit signals from the remote thermometer 20 to switching circuits 26. A computer 30 via a line 28 controls the timing of and the operation of the switching circuits 26. In a similar manner, a line 32 delivers control and timing signals from the computer 30 to the laser 14. As is well understood by those skilled in the art, the word "line" as used herein, such as 28 and 32, may represent relays, a plurality of electrical conductors, or other electronic circuits and/or components to transmit and handle the signals involved.

A pair of lines 34 and 36 deliver signals from switching circuits 26 to a pair of signal holding circuits 38 and 40, respectively. After circuits 38 and 40, a pair of lines 42 and 44, respectively, deliver the signals to the computer 30. The holding circuits 38 and 40 are required in order to assure that the two different reflected signals, one created by the reflected pulse from the laser, are not lost. Line 36 includes a branching line which delivers the signal thereon to a small computation circuit 46 which determines the value of a quantity known as $T_A$, and this value is delivered on a line 48 to a computer 30. The quantity $T_A$ is needed to determine the true temperature, as will appear in the mathematics below. The computation for $T_A$ would most probably be performed by circuitry internal to the receiver 20 but could alternatively be performed by the computer 30. The drawing is as shown for aid in understanding the equations which follow.

The method of the invention requires that the altitude of the aircraft 10 above the earth being surveyed be known, because, in general terms, the amount of laser energy reflected, indicated by the arrow 18, will vary inversely with altitude. To this end, means 50, which may comprise simply the radio altimeter of the aircraft 10, is connected by a line 52 into computer 30 to supply this data. Alternatively, a simple timing circuit could be used to measure the time interval between the laser turning on and the time the reflected energy is received, thus defining the distance to the ground. Such timing circuits are commonly utilized in radar for this purpose. A line 54 from computer 30 delivers the final result, corrected or true surface temperature, to suitably display and/or recording means indicated at 56.

The method of the invention comprises the following steps:

1. Measure the apparent surface temperature. For example, with a remote sensor such as an aerial infrared radiometer. This result will contain the emissivity aberration.

2. Measure the reflectivity of the surface using a $CO_2$ laser.

3. Calculate a value for emissivity using the measured value of reflectivity.

4. Correct the measured result of step 1 with the determined value of emissivity from step 3 to thereby obtain a true temperature survey.

The following mathematical analysis shows a method of performing these steps. In the following procedure, steps 2 and 3 are combined and emissivity is found more or less directly, however, reflectivity is effectually handled because it is cancelled, as will now appear.

The Stephan-Boltzmann Law states:

$$W = C_{SB} T^4$$

1.

where $W$ is radiant emittance in watts per $cm^2$, $C_{SB}$ is the Stephan-Boltzmann constant in watts per $cm^2$ per degree $K^{+4}$, and $T$ is temperature in degrees K. A literature reference to this Law is Hudson, R.D., 1969: Infrared System Engineering, John Wiley & Sons, New York, p. 37, eqn. 2–9. Defining $W_A$ as the radiant emittance of the ground being surveyed and $T_A$ as the apparent, i.e., uncorrected for emissivity, surface temperature of that ground, and solving for $T_A$, equation 1 becomes:

$$T_A = (W_A/C_{SB})^{1/4}$$

2.

Thus, the radiant emittance $W_A$ detected by the receiving system 20–22, which does not include any reflected laser energy, can be used to determine the apparent temperature $T_A$ of the survey ground. As mentioned above, this step would most likely be performed by comparison with an internal standard known as a "blackbody," which is a part of the receiver 20. This receiver has been calibrated, as noted above, with a particular narrow spectral filter 22 in place. Referring back to the drawing, line 36 delivers signals proportional to $W_A$ to components 40 and 46. The following equation, known as Kirchhoff's Radiation Law, see Wolfe, W.L., editor, 1965: "Handbook of Military Infrared Technology," U.S. Government Printing Office, p. 9, eqn. 2–4, relates emissivity E with the detected emittance $W_A$, and with $W_{BB}$. $W_{BB}$ represents the so-called "black-body" radiant emittance, and may be thought of as the emittance of the rocks due only to their true temperature. More scientifically, $W_{BB}$ represents the radiated energy if $E$ were equal to unity.

$$W_A = EW_{BB}$$

3.

Computer 30 via line 32 causes the laser 14 to pulse rapidly on and off, for example, at a frequency of 100 times a second. 100 cps is an arbitrary figure determined principally by commercially available equipment. The factors which must be considered in this regard are how fast is the plane flying; how much laser power is available at the proposed cycle rate; how sensitive is the receiver 20; and how large an area of ground is to be used as a "sample," i.e., one laser on-off cycle times velocity of aircraft = length of "sample space." This "sample space" is considered as homogeneous. Faster plane speed and/or smaller sample space requires a higher repetition rate for the laser. For earth surveys, a sample space about 20 feet long is desirable. When the laser is on, arrow 18 represents the natural energy $W_A$ plus the reflected laser energy, and Equation 3 becomes:

$$W_{AL} = EW_{BB} + RW_S$$

4.

where $W_{AL}$ is natural plus laser radiant emittance, $R$ is the reflectivity of the rocks being examined, and $W_S$ is the radiant emittance of the laser. Thus, equations 3 and 4 describe the energy received when the laser is on and when it is off, respectively.

Kirchhoff's Law, see above reference, can also be stated as:

$$R + E = 1$$

5.

for the limiting conditions of an opaque material. Rearranging Equation 5 and substituting into Equation 4, Equation 4 becomes:

$$W_{AL} = EW_{BB} + (1-E) W_S$$

6.

It should be noted that (1-E) is $R$ from Equation 5, and thus a value for $R$ could be found if it were desired, as per the following Equation 7. Substituting Equation 3 in Equation 6 and solving directly for $E$ yields:

$$E = 1 - (W_{AL} - W_A/W_S)$$

7.

It is desired to use this value of $E$, which can be determined in the computer 30, to find $T_{BB}$. $T_{BB}$, most strictly, represents the temperature of the equivalent black-body, and corresponds to $W_{BB}$ as defined above.

In practice, $T_{BB}$ as determined in the invention may be used as if it were $T_{TRUE}$, the actual surface temperature of the earth being examined. The only difference is due to slight absorption of the radiant energy by the atmospheric column between the surface and the aircraft. This is normally very small under the conditions of the usual survey, i.e., nighttime and a clear, moonless sky. The lower the altitude and/or the drier the air, the less the error. Another source is slight variations in surface roughness. The size of the sample space is selected to statistically smooth these variations and other minor in-homogeneities. Still another is the radiance falling on the surface due to the temperature of the sky. All of these variations have all been shown to cause negligible total errors in the measured temperature; see Saunders, P. M., 1970: "Corrections for Airborne Radiation Thermometry," Journal of Geophysical Research No. 75, no. 36, P. 7,596–7601. In practice, these minor sources of error have virtually no importance because the earth scientist is not really so much interested in the temperature per se, but rather is interested in temperature anomaly, and the error sources effect all measurement, equally, i.e., the error is a constant and "drops out" in the interpretation of the data produced by the invention. Using Equation 1 and black-body values, the following relationship can be defined:

$$T_{BB} = (W_{BB}/C_{SB})^{1/4} = T_{TRUE} \qquad 8.$$

Using Equation 3 to express $W_{BB}$ in terms of $E$, and substituting yields:

$$T_{TRUE} = \left(\frac{W_A}{\frac{E}{C_{SB}}}\right)^{1/4} \qquad (9)$$

Now referring to Equation 1 to express $W_A$ in terms of the determined $T_A$, and substituting into Equation 9, yields:

$$T_{TRUE} = \left(\frac{(T_A^4 C_{SB})}{\frac{E}{C_{SB}}}\right)^{1/4} = \frac{T_A}{(E)^{1/4}} \qquad (10)$$

Thus, the measured and determined apparent surface temperature is corrected for the emissivity error contained therein to thereby determine the true surface temperature. The laser is pulsed on and off to thereby effectually permit determination of the reflectivity $R$ of the survey ground, see step two of the four step method above. However, the equations are manipulated, see Equations 3 through 6 above, to directly determine $E$.

Contained within computer 30 is a previously determined calibration curve or set of values correlating the laser return signal, radiant emittance $W_S$, against altitude. This is accomplished by flying apparatus 12 over a standardized geological sample, at different altitudes, and making measurements. A relatively small piece of ground can be standardized by simply making contact temperature measurements on the ground. Further, in this regard, the computer 30, in a well known manner, could automatically monitor altitude as by device 50 and automatically and continuously suitably correct $W_S$. The circuitry will also include suitable electronic means to maintain a stable power output from the laser, or alternatively to monitor the output produced and accordingly correct $W_S$ as received.

Use of the invention method and apparatus will be greatly simplified by flying such surveys at night, and more specifically, on a clear, moonless night. During the daylight hours, the sun will heat different rocks differently dependent upon their color, and the ground reflects some solar energy. Flying at night eliminates these effects, thus rendering the data more useful to an earth scientist. Additionally, it is preferred to fly late at night because the different earth surface materials will be thermally stable and therefore will have a less pronounced effect on the measured surface heat.

While the invention has been described in detail above, it is to be understood that this detailed description is by way of example only, and the protection granted is to be limited only within the spirit of the invention and the scope of the following claims.

I claim:

1. A method of making a remote surface temperature survey of a portion of the earth from an aircraft flying over said portion of the earth, comprising the steps of determining a value for the apparent surface temperature of said portion of the earth based on measurements made from said aircraft, determining a value for the reflectivity of said portion of the earth based on measurements made from said aircraft, determining a value for the emissivity of said portion of the earth by using said value for reflectivity, measuring the altitude of said aircraft above said portion of the earth, using the measured value for aircraft altitude to correct the determined value for emissivity for the height of the aircraft above said portion of the earth, and using the corrected determined value for emissivity to correct the value of apparent surface temperature for the emissivity error contained therein.

2. The method of claim 1, and flying said aircraft at night to make said survey.

3. The method of claim 2, wherein said value for apparent temperature is determined by the steps of measuring the natural radiant emittance of said portion of the earth, and using the value measured for natural radiant emittance to determine apparent temperature.

4. The method of claim 2, wherein said value for reflectivity is determined by measuring the natural radiant emittance of said portion of the earth, measuring the radiant emittance of said portion of the earth when said portion of the earth is exposed to energy from a $CO_2$ laser on board said aircraft, and using said two different values of radiant emittance of said portion of the earth and a value of radiant emittance of said laser dependent upon the height of said aircraft above said portion of the earth to determine said value for reflectivity of said portion of the earth.

5. The method of claim 4, wherein said laser is pulsed on and off to alternately permit measurement of said two different values of radiant emittance of said portion of the earth.

6. The method of claim 5, wherein said laser is pulsed on and off at about 100 cycles per second.

7. Apparatus for making a remote surface temperature survey of a portion of the earth comprising a vehicle for traversing said portion of the earth, a $CO_2$ laser adapted to direct its energy onto said portion of the earth, energy receiving means on said vehicle, computer means on said vehicle for manipulating signals from said energy receiving means and for controlling said laser; to determine the apparent surface temperature, the reflectivity and then the emissivity of said portion of the earth, and using said determined value for emissivity in said computer to correct said apparent surface temperature for the emissivity error contained therein.

8. The combination of claim 7, wherein said vehicle comprises an aircraft, means for measuring the altitude of said aircraft above said portion of the earth as said survey is being made, means for sending signals from said altitude measuring means to said computer means, whereby said measured value for altitude may be used to correct the determined value for emissivity for the height of said aircraft above said portion of the earth.

9. The combination of claim 7, and said computer means including means to pulse said laser on and off, whereby the natural radiant emittance of said portion of the earth and the radiant emittance of said portion of the earth when said portion of the earth is exposed to said laser energy may both be measured to permit determination of a value for the reflectivity of said portion of the earth.

10. The combination of claim 9, wherein said laser is pulsed on and off at about 100 cycles per second.

11. The combination of claim 7, wherein said energy receiving means comprises an infrared remote thermometer and a 10.6 micrometer filter.

* * * * *